US006950862B1

(12) United States Patent
Puthiyandyil et al.

(10) Patent No.: US 6,950,862 B1
(45) Date of Patent: Sep. 27, 2005

(54) SYSTEM AND METHOD FOR OFFLOADING A COMPUTATIONAL SERVICE ON A POINT-TO-POINT COMMUNICATION LINK

(75) Inventors: Sanil Kumar Puthiyandyil, Schaumburg, IL (US); Janakiraman Senthilnathan, Mount Prospect, IL (US); Rajesh Ramankutty, Schaumburg, IL (US); Shaji Radhakrishnan, Mount Prospect, IL (US)

(73) Assignee: 3Com Corporation, Marlborough, MA (US)

( * ) Notice: Subject to any disclaimer, the term of this patent is extended or adjusted under 35 U.S.C. 154(b) by 783 days.

(21) Appl. No.: 09/850,176

(22) Filed: May 7, 2001

(51) Int. Cl.$^7$ .......................................... G06F 15/177

(52) U.S. Cl. ...................... 709/220; 709/202; 709/219; 709/222; 709/228; 709/237; 709/223; 455/438; 455/436; 370/331; 370/335

(58) Field of Search ................................ 709/200, 202, 709/219, 222, 228, 223, 235; 455/436, 438; 370/331, 335

(56) References Cited

U.S. PATENT DOCUMENTS

| | | | |
|---|---|---|---|
| 5,528,595 A | 6/1996 | Walsh et al. ............. 370/85.13 |
| 6,151,636 A | 11/2000 | Schuster et al. ............ 709/247 |
| 6,170,075 B1 | 1/2001 | Schuster et al. ............ 714/776 |
| 6,466,976 B1 * | 10/2002 | Alles et al. ................. 709/224 |
| 6,542,504 B1 * | 4/2003 | Mahler et al. .............. 370/392 |
| 6,654,808 B1 * | 11/2003 | Chuah ....................... 709/227 |
| 2002/0010866 A1 * | 1/2002 | McCullough et al. ....... 713/201 |
| 2002/0133534 A1 * | 9/2002 | Forslow ..................... 709/200 |

OTHER PUBLICATIONS

Nicholas Cravotta, "Accelerating High Speed Encryption: One Bottleneck After Another", www.ednmag.com, Aug. 16, 2001, p. 38-49.
Townsley et al., "Layer Two Tunneling Protocol "L2TP"", draft-ietf-pppext-12-tp-16.txt, Jun. 1999, pp. 1-64.
W. Simpson, "*The Point-to-Point Protocol (PPP)*", Network Working Group, RFC 1661, Jul. 1994, pp. i-11.
D. Rand, "*The PPP Compression Control Protocol (CCP)*", Network Working Group, RFC 1962, pp. 1-9.

(Continued)

*Primary Examiner*—Hosain Alam
*Assistant Examiner*—Asad Nawaz
(74) *Attorney, Agent, or Firm*—McDonnell Boehnen Hulbert & Berghoff LLP

(57) ABSTRACT

A system and method are shown for offloading a computational service on a point-to-point connection. When a tunnel initiator network device, such as a Level 2 Tunneling Protocol Access Concentrator (LAC), detects a tunnel client network device, the LAC sets up a tunnel connection with a tunnel endpoint network device, such a Level 2 Tunneling Protocol Network Server (LNS). During a process of establishing a call session on the tunnel connection, the LAC sends its compression capabilities to the LNS. When the LNS detects that the LAC is capable of compressing tunnel packets, the LNS negotiates compression parameters with the tunnel client network device. Subsequently, the LNS transmits the negotiated compression parameters to the LAC that configures a compression engine based on the received compression parameters. Hereinafter, the tunnel client network device will send compressed tunnel packets to the LAC that will decompress the received tunnel packets prior to transmitting the tunnel packets to the LNS on the tunnel connections. Similarly, the LNS will send uncompressed tunnel packets on the tunnel connection to the LAC that will compress the received tunnel packets prior to transmitting the tunnel packets to the tunnel client network device.

17 Claims, 11 Drawing Sheets

OTHER PUBLICATIONS

Friend et al., *"PPP Stac LZS Compression Protocol"*, Network Working Group, RFC 1974, Aug. 1996, pp. 1-20.

D. Rand, *"PPP Predictor Compression Protocol"*, Network Working Group, RFC 1978, Aug. 1996, pp. 1-9.

J. Woods, *"PPP Deflate Protocol"*, Network Working Group, RFC 1979, Aug. 1996, pp. 1-10.

Sklower et al., *"The PPP Multilink Protocol (MP)"*, Network Working Group, RFC 1990, Aug. 1996, pp. 1-24.

G. Pall, *"Microsoft Point-to-Point Compression (MPPC) Protocol"*, Network Working Group, RFC 2118, Mar. 1997, pp. 1-9.

Rigney et al., *"Remote Authentication Dial In Use Service (RADIUS)"*, Network Working Group, RFC 2138, Apr. 1997, pp. 1-23.

Valencia et al., *"Cisco Layer Two Forwarding (Protocol) "L2F""*, Network Working Group, RFC 2341, May 1998, pp. 1-29.

D. McDonald, *"PF _KEY Key Management API, Version 2"*, Network Working Group, RFC 2367, Jul. 1998, pp. 1-68.

Townsley et al., *"Layer Two Tunneling Protocol "L2TP""*, Network Working Group, RFC 2661, Aug. 1999, pp. 1-20.

* cited by examiner

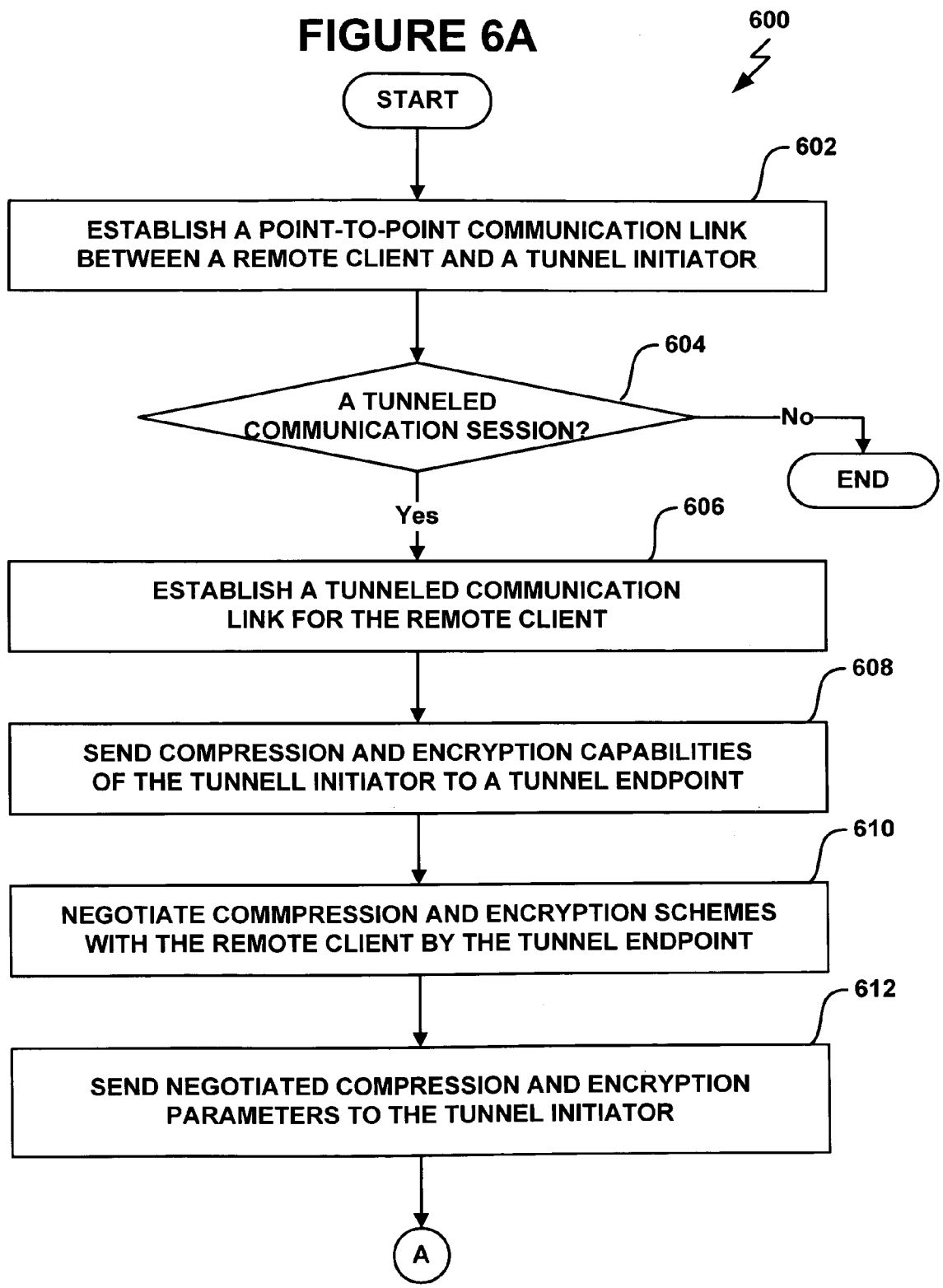

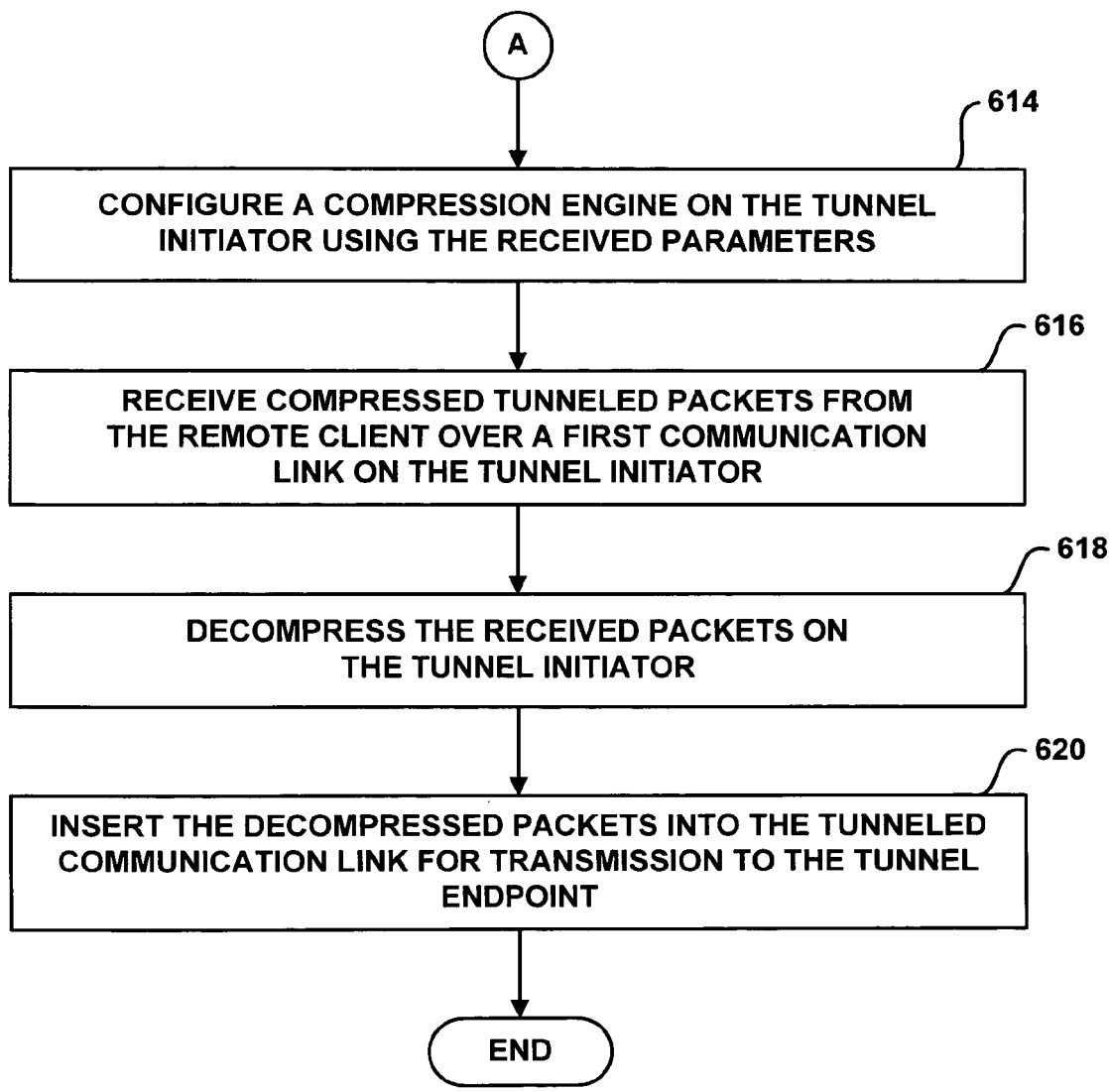

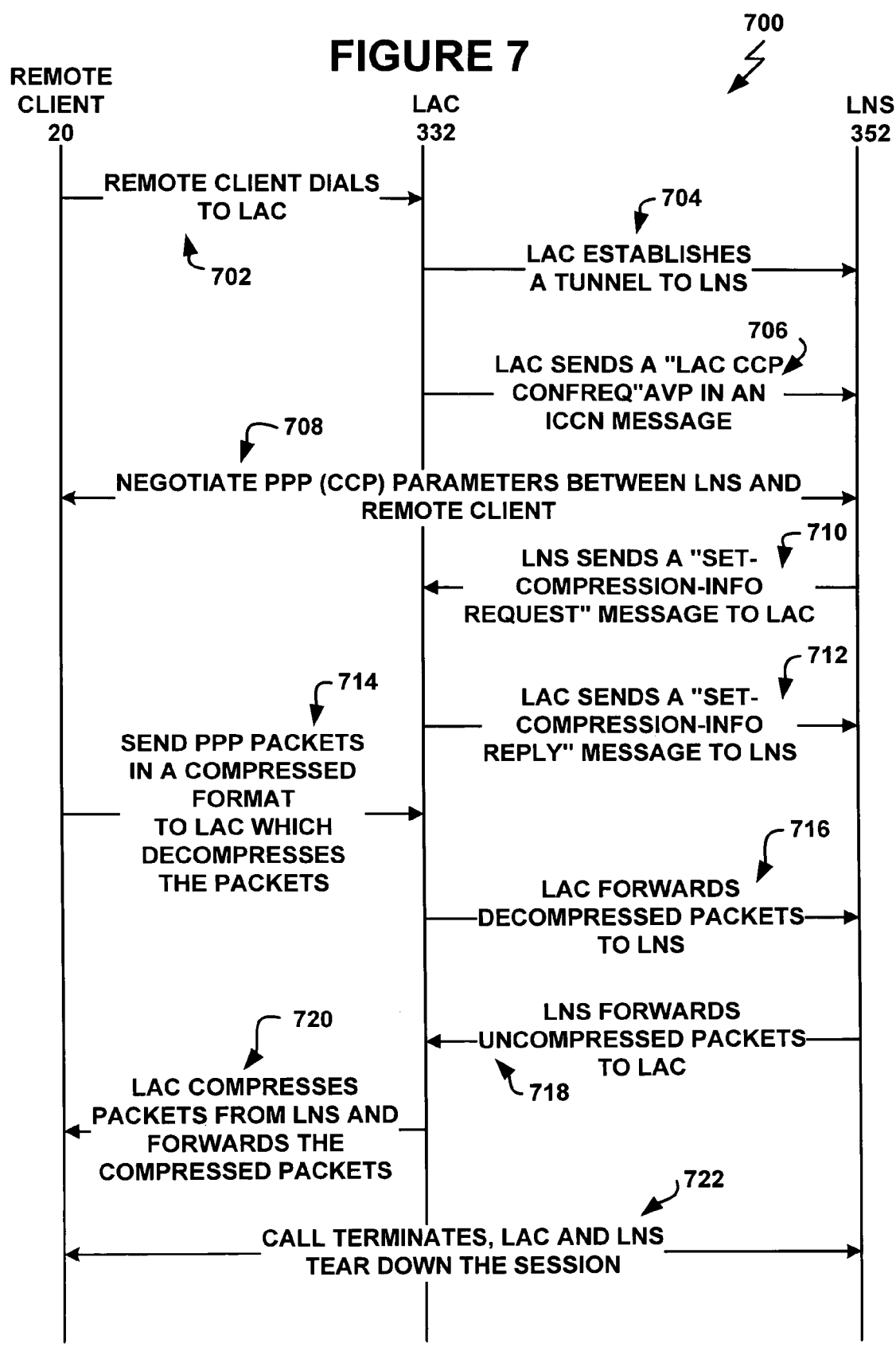

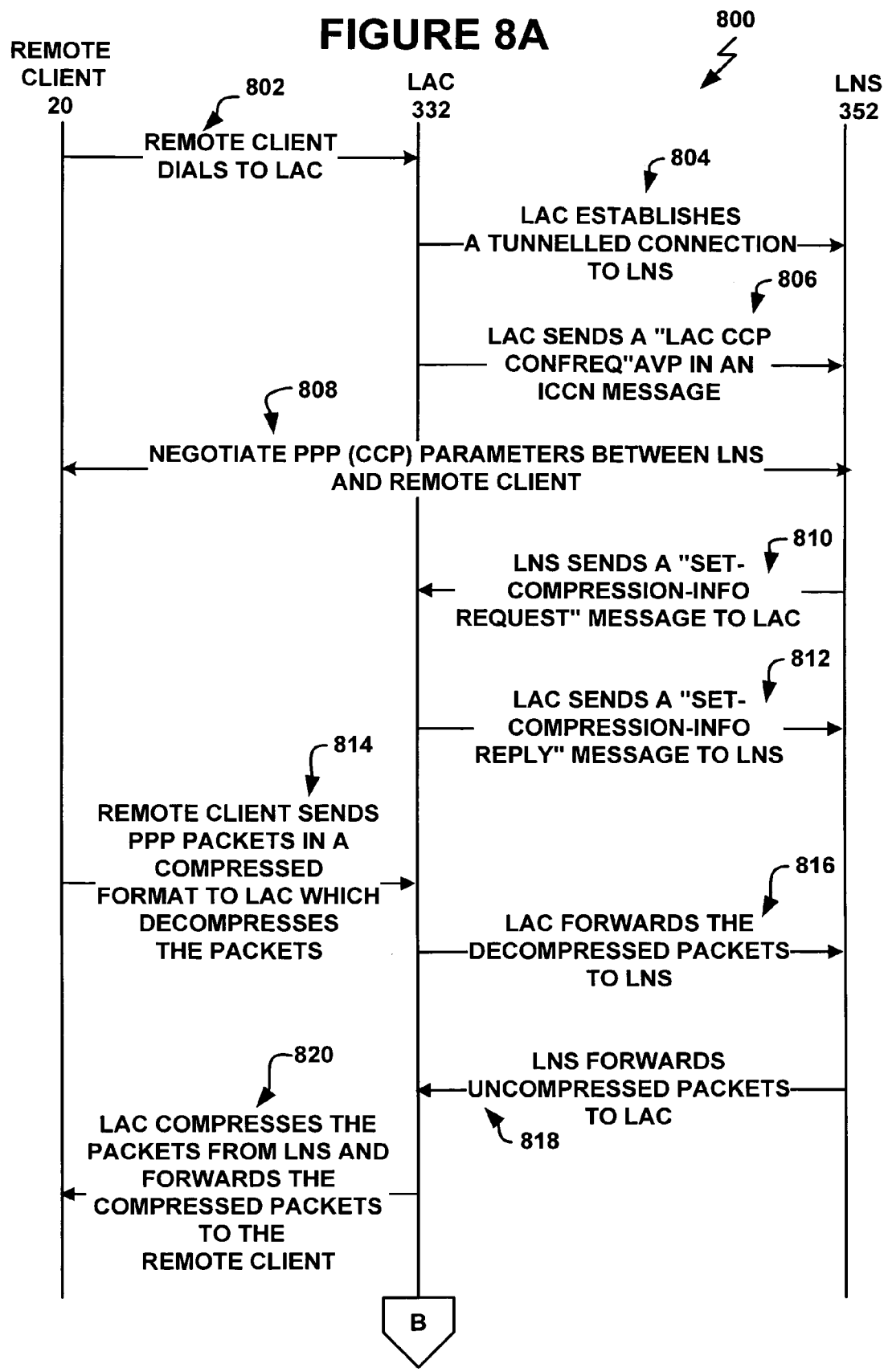

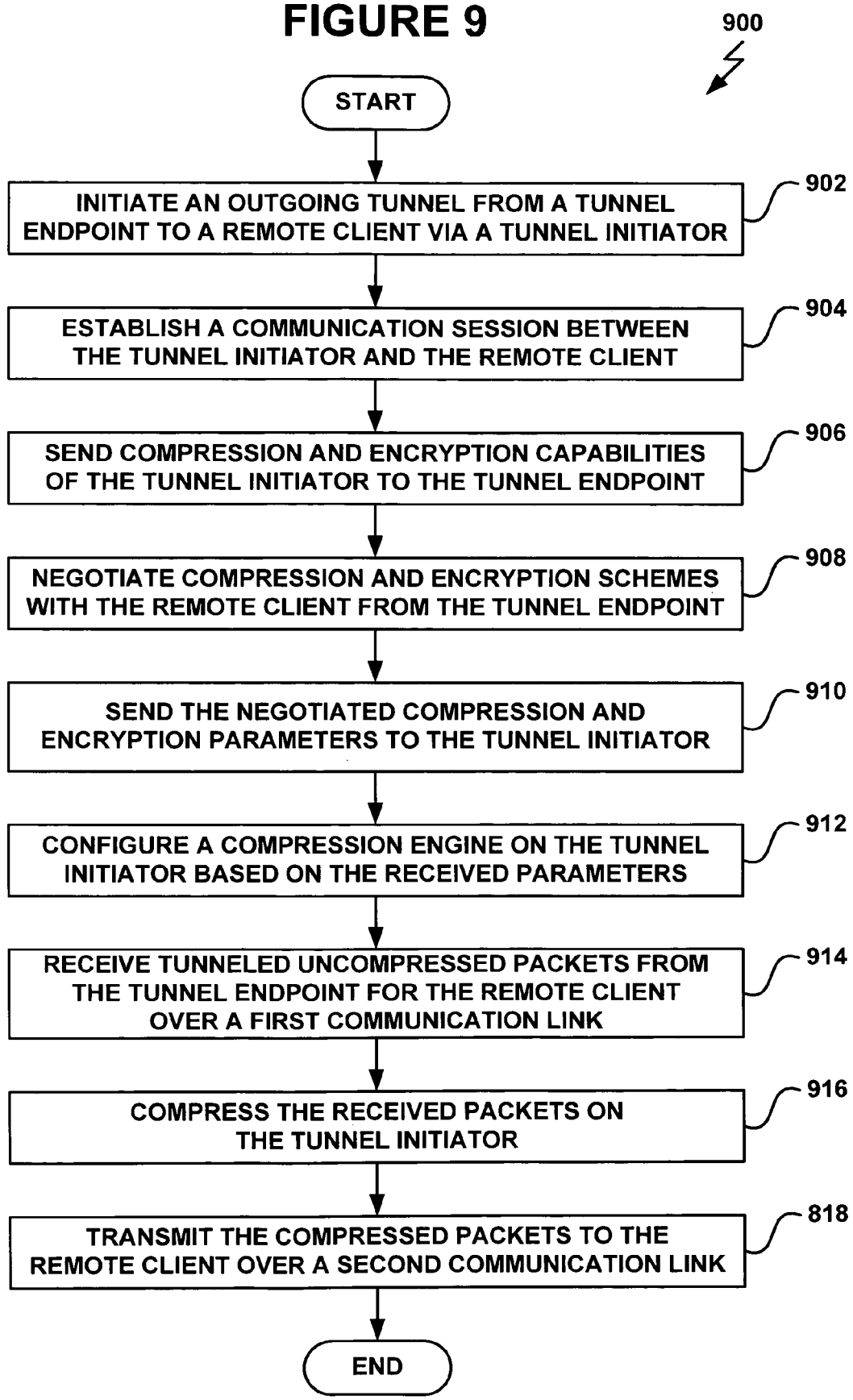

SYSTEM AND METHOD FOR OFFLOADING A COMPUTATIONAL SERVICE ON A POINT-TO-POINT COMMUNICATION LINK

FIELD OF INVENTION

The present invention relates to data communications. More specifically, it relates to computational service offloading, such as compression and encryption offloading, across point-to-point communication links.

BACKGROUND OF THE INVENTION

Connection oriented point-to-point communication links, such as a Layer 2 Tunneling Protocol (L2TP) tunnel, are an increasingly common feature of network infrastructures. Tunnels are prearranged connections established by agreement between internet service providers (ISPs). See Request for Comment (RFC) 2661 and *Layer Two Tunnelling Protocol (L2TP)*, A. Valencia, et al., draft-ietf-pppext-l2tp-16.txt, June 1999, herein incorporated by reference, available from the Internet Engineering Task Force (IETF) website.

FIG. 1 shows an architecture 100 involving an internet protocol (IP) network 70 to which a tunnel initiator 30 is linked via a network connection 32, a tunnel initiator 40 is linked via a network connection 42 and a tunnel endpoint 50 is linked via a network connection 52. A remote client 20 is linked to the tunnel initiator 30 via a communication link 22 that is tunneled through the IP network 70 via a tunnel connection 56 from the tunnel initiator 30 to the tunnel endpoint 50. Another remote client 24 is linked to the tunnel initiator 40 via a communication link 26 that is tunneled through the IP network 70 via a tunnel connection 66 from the tunnel initiator 40 to the tunnel endpoint 50. The tunnel endpoint device 50 is also connected to a Local Area Network ("LAN") 80 via a network connection 54. A server device 84 is linked to LAN 80.

One example of a tunnel initiator or tunnel endpoint device is a network access server, such as that described in the patent to Dale M. Walsh et al., U.S. Pat. No. 5,528,595, which is fully incorporated by reference herein and describes an integrated network access server suitable for use in the present invention. Such a device has been commercialized widely by 3Com Corporation (previously U.S. Robotics Corp.) under the trade designation Total Control™ Enterprise Network Hub. Network access servers similar in functionality, architecture and design are available from other companies, including Ascend Communications, Livingston Enterprises, Multitech, and others. The invention is suitable for implementation in network access servers from the above companies, and other similar devices.

An L2TP tunnel typically provides a conduit for communications between a client device served by a tunnel initiator and a server device served by tunnel endpoint, i.e. tunnel connection 56 between tunnel initiator 30 and tunnel endpoint 50 that transports communication between remote client 20 and server 84. Typically, a single tunnel slot provides the communication link between a client and server.

When a client device, such as device 20 or 24, establishes a dial-up connection with a tunnel initiator (TI) 30 or 40, then the TI typically recognizes the client device as a tunnel client by means of an authentication protocol, such as RADIUS, see Request For Comment (RFC) 2138, herein incorporated by reference. An authentication, authorization and accounting (AAA) server 74, such as a RADIUS server, may be connected to the IP network 70 to provide AAA services to the tunnel initiators and other devices on the network. The authentication process can be adapted to provide an address for a tunnel endpoint device for the client. There exist other means for identifying a tunnel client, such as through the use of a mobile identification number (MIN) in mobile applications or, for protocols not directed toward mobile applications, the use of a Dial-up Number Information Service (DNIS) or Automatic Number identification (ANI), that can also be used to identify a tunnel endpoint for a client and establish a tunnel connection. Alternatively, the client device itself may provide the tunnel endpoint address. In still another approach, each TI may have a pre-constructed table containing entries that associate a client device identifier with a tunnel endpoint address value. Independent of how the tunnel endpoint address is obtained, the tunnel initiator will establish a tunnel connection to the tunnel endpoint device, e.g. the tunnel endpoint 50.

FIG. 2 is a protocol stack diagram 200 illustrating an example of the protocol relationships in a conventional tunnel structure. As is known in the art, the Open System Interconnection ("OSI") model is used to describe computer networks. The OSI model consists of seven layers including from lowest-to-highest, a physical, data-link, network, transport, session, application and presentation layer. The physical layer, or layer 1, transmits bits over a communication link. The data link layer, or layer 2, transmits error free frames of data. The network layer, or layer 3, transmits and routes data packets. FIG. 2 illustrates an example of the protocol stacks in each of the remote client 20, tunnel initiator 30, tunnel endpoint 50, and server 84 for tunnel connection 56 of FIG. 1. Link 22 between the remote client 20 and tunnel initiator 30 can involve a wireless link protocol, such as the Radio Link Protocol ("RLP"), a dial-up type protocol, such as the Point-to-Point Protocol (PPP) or Serial Line Interface Protocol (SLIP), a network type protocol, such as the Media Access Control ("MAC") protocol of Ethernet, or other types of links as the application demands. Thus, a layer 1 to layer 1 (L1) session is represented at the lowest level of the protocol stacks in FIG. 2 between the remote client 20 and tunnel initiator 30. Because the link between the remote client and tunnel initiator is typically a serial link, a serial data link protocol session exists at layer 2 (L2) between the remote client 20 and tunnel initiator 30.

When a tunnel is established from the tunnel initiator 30 to the tunnel endpoint 50, there are layer 1 (L1) and layer 2 (L2) sessions between the tunnel servers as well as an L2TP session that represents the tunnel connection 56 itself. Once the tunnel connection is established, a session between network layer peers, such as internet protocol (IP) peers, in the remote client 20 and tunnel endpoint 50 typically exists. A session also typically exists between transport layer peers in the remote client 20 and the server 84. Transport layer protocols such as Transmission Control Protocol ("TCP") and User Datagram Protocol ("UDP") are often used over IP in computer networks. The Transmission Control Protocol provides a connection-oriented, end-to-end reliable protocol designed to fit into a layered hierarchy of protocols that support multi-network applications. The User Datagram Protocol provides a transaction oriented datagram protocol, where delivery and duplicate packet protection are not guaranteed.

A second IP (IP2) and UDP (UDP2) peer relationship exists for routing of packets over the network 70 between the tunnel initiator 30 and the tunnel endpoint 50. In addition, a PPP peer relationship typically exists between the remote client 20 and the tunnel endpoint 50, where the PPP packets become the payload for the tunnel connection between the tunnel initiator 30 and tunnel endpoint 50. PPP is described in further detail in RFC 1661, herein incorporated by reference for all purposes.

Communication links from remote clients to tunnel initiators may take any of a variety of forms. If a remote client is connected to a public switched telephone network ("PSTN"), the communication links may include unshielded twisted pair of copper wires extending from a remote client's modem to a telephone company central office. While the quality of transmission over a conventional telephone line may vary, a typical telephone dial-up connection has a bandwidth of about 3 kHz and a signal-to-noise ratio of about 30 dB, thus, producing a bit rate of about 30 kbps.

Therefore, due to the limited bit rate, the telephone dial-up connections that are tunneled from a remote client to a tunnel endpoint typically suffer on the performance throughput. To overcome the throughput limitations of the telephone dial-up connections, one solution includes compression of data at the remote client prior to transmission of the data over a tunnel to a tunnel endpoint that, upon a receipt of the compressed data, decompresses the received data. However, the number of tunnel connections terminating at the tunnel endpoint is constantly growing, and it typically ranges from a few hundred to a few thousand tunnel connections terminating on the tunnel endpoint.

During a typical process of establishing a point-to-point communication link between the remote client 20 and the tunnel endpoint 50, the remote client 20 may negotiate compression and encryption parameters with the tunnel endpoint 50. The protocol stack of the remote client 20 typically includes a compression negotiator and a compression engine in the PPP stack, as illustrated in FIG. 2, to negotiate compression parameters with a compression negotiator on the tunnel endpoint 50. In such an embodiment, in addition to the compression negotiator, the tunnel endpoint 50 includes a compression engine that performs compression and encryption on the point-to-point communication link between the remote client 20 and the tunnel endpoint 50. However, compressing and decompressing data for many tunnel connections on the tunnel endpoint presents a heavy computational load that prevents the tunnel endpoint from supporting a large number of tunnel connections. As a result, the tunnel endpoint typically rejects any attempt by the client device to negotiate a communication link that employs compression or encryption.

As is also known in the art, Layer 2 point-to-point data transport typically uses an unreliable communication mechanism, e.g. UDP, and does not guarantee a reliable sequenced delivery of packets. Further, since the Layer 2 point-to-point assumes a sequence in data delivery, out of sequence packets and packets lost during transmission adversely affect the compression and encryption mechanism. Thus, compressing packets at a tunnel endpoint does not result in a good point-to-point compression performance. Due to these reasons, the tunnel endpoints typically reject user requests to perform the point-to-point compression and encryption and, consequently, the end user connections suffer low-level throughputs.

Thus, the need remains for a system and method for increasing remote clients' data throughput over tunnel connections.

SUMMARY OF THE INVENTION

In accordance with preferred embodiments of the present invention, some of the problems associated with data throughput over tunneled connections are overcome.

An embodiment of a method for providing at least one computational service on a communication link, according to the present invention, involves detecting a call associated with at least one remote client in communication with a first network device and, responsive to detecting the call, establishing a communication link from the first network device to a second network device. In one embodiment, the communication link established between the first network device and the second network device includes a point-to-point connection such as a Layer 2 Tunneling Protocol (L2TP) tunnel connection, the first network device includes a tunnel initiator such as a Layer 2 Tunneling Protocol Access Concentrator (LAC), and the second network device includes a Layer 2 Tunneling Protocol Network Server (LNS). The method also includes providing at least one computational service capability parameter associated with at least one computational service capability on the first network device to the second network device during a connection connect set up on the communication link. In one embodiment, the computational service capability parameter is associated with a computationally intensive capability parameter such as, for example, a compression capability or an encryption capability. Responsive to receiving the at least one computational service capability on the second network device, the method includes negotiating computational service parameters between the second network device and the remote client device and sending the negotiated computational service parameters from the second network device to the first network device. The method then sets forth configuring the first network device to use the received negotiated computational service parameters for providing computational services for packets received from the second network device prior to transmitting the packets received from the second network device to the remote client device and, further, for providing computational services to packets received from the remote client device prior to transmitting the packets received from the remote client device to the second network device. In one embodiment, where the computational services include compression services, the method includes, receiving compressed packets from the remote client device on the first network device and, responsive to receiving the compressed packets, decompressing the packets on the first network device and transmitting decompressed packets to the second network device. In such an embodiment, the method also includes receiving uncompressed packets on the first network device from the second network device and, responsive to receiving uncompressed packets from the second network device, compressing the received packets and sending the compressed packets from the first network device to the remote client network device.

An embodiment of a communication system, according to the present invention, includes a first network device communicating with at least one remote client device on a first computer network, the first network device further coupled to a second computer network is configured to transmit a connection connect message on the second computer network that includes at least one computational service capability parameter associated with at least one computational capability available on a computational service engine associated with the first network device. The communication system also includes a second network device coupled to the second computer network and configured to receive the connection connect message with the at least one computational service capability parameter available on the computational service engine and, responsive to receiving such a message, configured to negotiate computational services with the at least one remote client device. Upon the successful negotiation of the computational service parameters, the second network device is configured to generate a computational service set up request message including the negotiated computational service parameters and is further configured to send the computational service set up request message on the second computer network. The first network device is also configured to receive the computational service set up request message from the second network device, and to implement the computational service parameters in the message on the computational service engine so that the computational service applies at least one computational service to packets received from the second network device prior to transmitting the received packets on the first computer network. The computational service engine is further configured to apply at least one computational service to packets received from the at least one remote client device prior to transmitting the packets on the second network. In one embodiment, the computational service includes a computationally intensive service such as a compression service. In such an embodiment, the computational service engine is configured to receive compressed packets from the remote client device, and responsive to receiving the compressed packets, the computational service engine is configured to decompress the packets and send the decompressed packets on the second computer network. Further, in such an embodiment, the computational service engine is configured to receive uncompressed packets on the second computer network from the second network device and, responsive to receiving the uncompressed packets, the computational engine is configured to compress the received packets and transmit the compressed packets on the first computer network to the remote client device.

The foregoing and other features and advantages of a preferred embodiment of the present invention will be more readily apparent from the following detailed description, which proceeds with references to the accompanying drawings.

BRIEF DESCRIPTION OF THE DRAWINGS

The present invention is described in the context of an embodiment of the invention with reference to the following drawings, wherein:

FIGS. 6A and 6B are a flow chart illustrating an exemplary method, according to the present invention, for tunneling incoming calls from a remote client;

FIG. 7 is a message sequence scenario illustrating an exemplary message flow for setting up a tunnel and a call session according to an embodiment of the present invention that increases data throughput on a tunneled connection;

FIGS. 8A and 8B are a message sequence scenario illustrating an exemplary message flow for setting up a tunneled connection and a call session according to an embodiment of the present invention that increases data throughput, where a tunnel endpoint detects communication errors; and FIG. 9 is a flow chart illustrating an exemplary method for tunneling outgoing calls according to an exemplary embodiment of the present invention.

DETAILED DESCRIPTION OF PREFERRED EMBODIMENTS

The present invention is directed toward a system and method for offloading at least one computational service on point-to-point connections.

Figure 1:
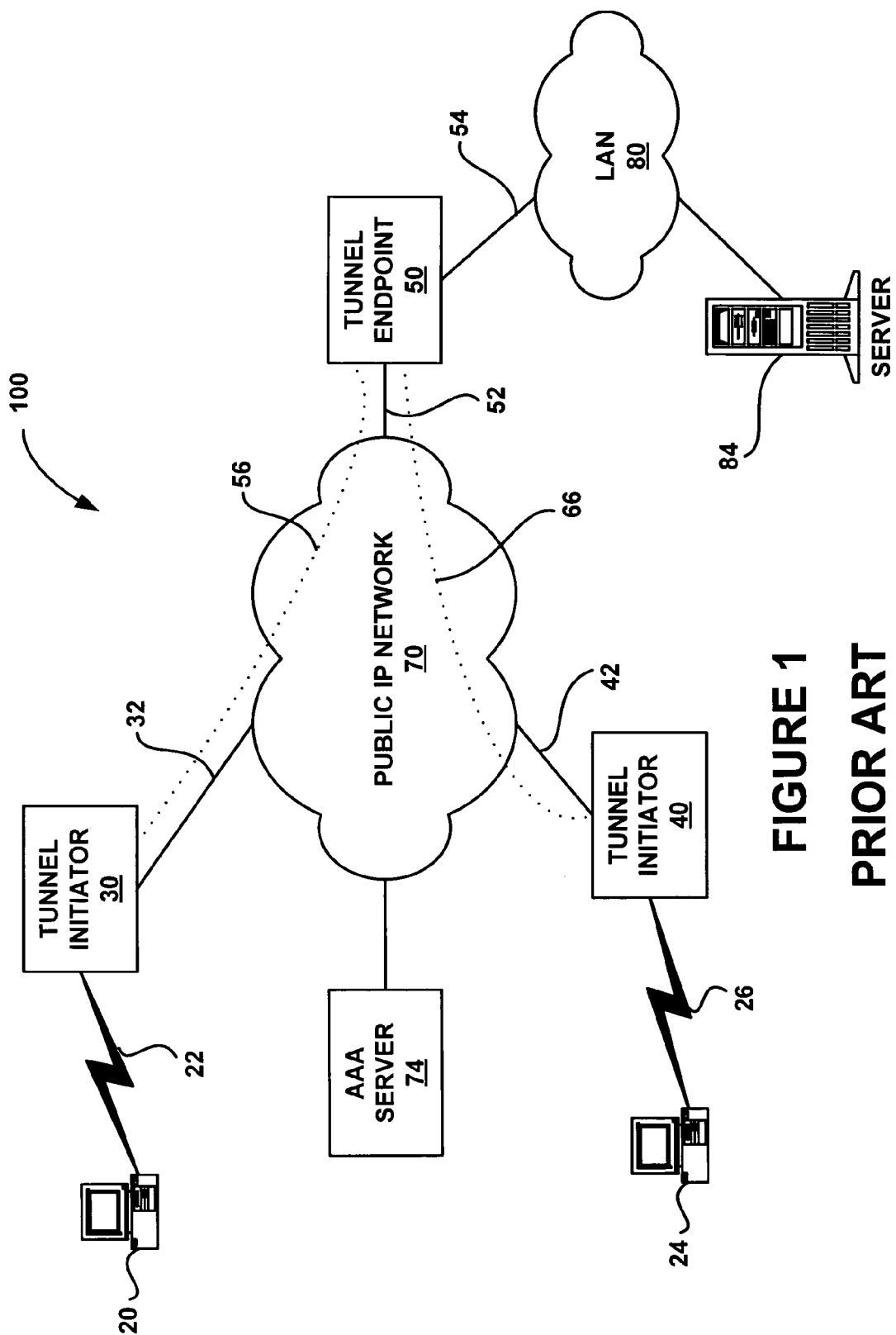
FIG. 1 is a functional block diagram illustrating an example of a network architecture having two prearranged tunnel connections that terminate on different endpoint devices.
Figure 3:
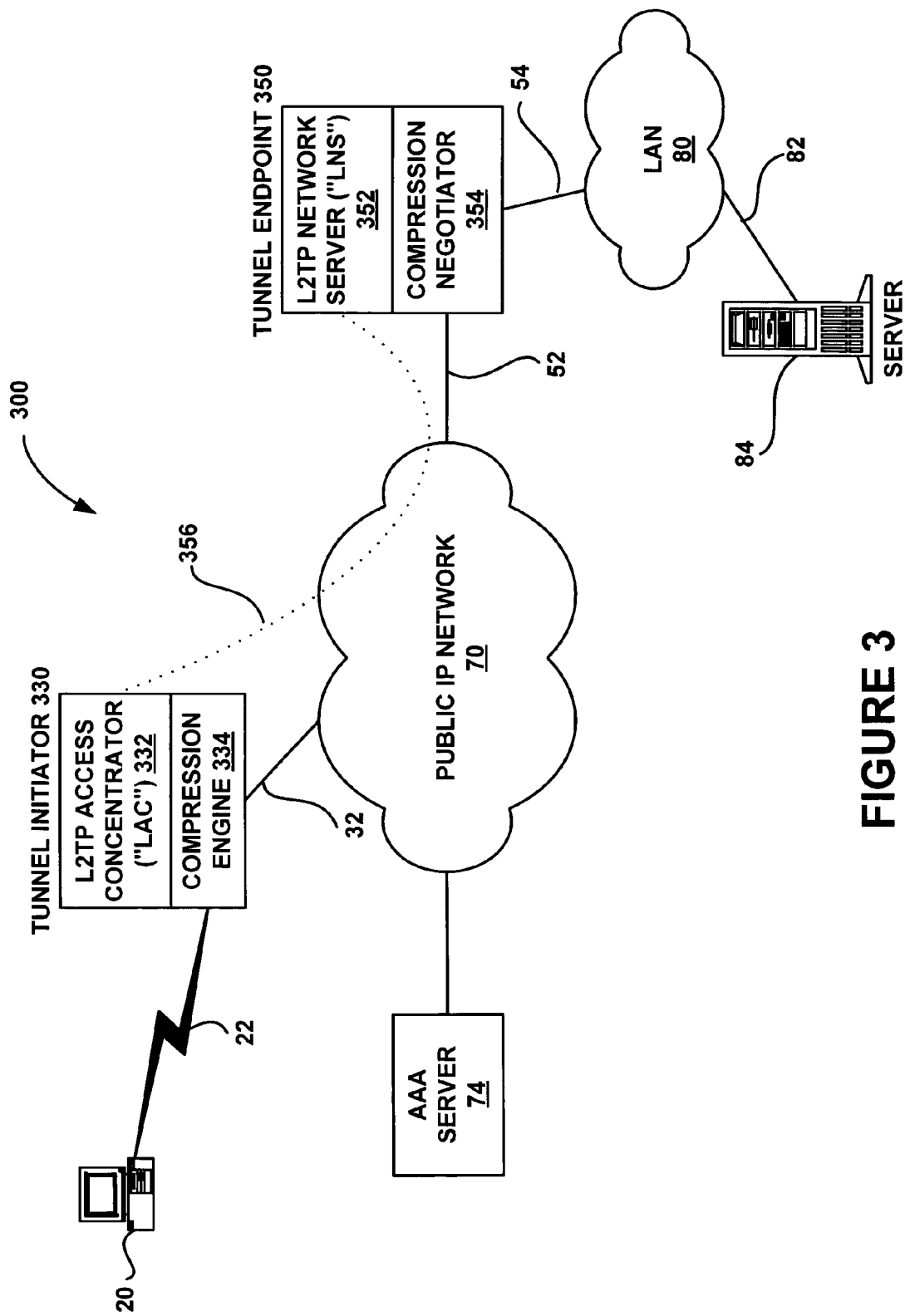
FIG. 3 is a functional block diagram illustrating a network architecture having a prearranged tunnel connection according to an embodiment of the present invention.

FIG. 3 is a functional block diagram illustrating an exemplary embodiment suitable for application of the present invention of network architecture 300 for offloading at least one computational service on a point-to-point connection. FIG. 3, as well as the remaining figures, will be described in reference to two exemplary computationally intensive services, a compression service and an encryption service. However, it should be understood that the system and methods described hereinafter are not limited to such computational services, and could be applied for other computational services. Further, FIG. 3, as well as the remaining figures, will be described in reference to one example of the point-to-point connection, a tunnel connection. However, it should be understood that the present invention is not limited to that particular point-to-point connection type, and it could be applied with other connection types. The network architecture 300 of FIG. 3 is similar to the architecture 100 of FIG. 1, except that the architecture 300 offloads the PPP data compression or encryption functionality from one network device, e.g. a tunnel endpoint 350 to another network device, e.g. a tunnel initiator 330.

According to the embodiment illustrated in FIG. 3, the tunnel initiator 330 includes an L2TP access concentrator ("LAC") 332 having a compression engine 334 that compresses and decompresses tunnel packets according to an embodiment described hereinafter. The tunnel endpoint 350 includes an L2TP network server ("LNS") 352 with a compression negotiator engine 354 that negotiates compression parameters with the remote client 20. FIG. 3 illustrates the compression negotiator engine 354 and the compression engine 334 incorporated into the LNS 352 and the LAC 332, respectively. However, it should be understood that the compression negotiator engine 354 and the compression engine 334 could be stand alone entities having communication links with the LNS 352 and the LAC 332, respectively.

When the remote client 20 establishes a communication session with the LAC 332 over the communication link 22, such as the PSTN 22, the LAC 332 determines whether the remote client 20 is a tunnel client using an authentication protocol. In the exemplary embodiment illustrated in FIG. 3, the LAC 332 queries the AAA server 74 that provides AAA services to tunnel initiators and other devices on the network. Upon a completion of the authentication process, the AAA server 74 may return an address of a tunnel endpoint associated with the remote client 20. In the embodiment illustrated in FIG. 3, the AAA server 74 returns an IP address of the LNS 352 located on the IP network 70.

Using the IP network address of the LNS 352 returned in response to the authentication query, the LAC 332 sets up an L2TP tunnel for the remote client 20. A typical process of setting up an L2TP tunnel consists of two steps: establishing a control connection for the L2TP tunnel and establishing a session as triggered by an incoming or outgoing call request. The control connection is the initial connection that is established between the LAC 332 and the LNS 352 prior to any communication sessions are established. The establishment of the control connection includes securing the identity of the peer and identifying the peer's L2TP version, framing and capabilities.

To initiate the control session, the LAC 332 sends a Start-Control-Connection-Request ("SCCRQ") message to the LNS 352. The SCCRQ message includes a plurality of fields such as a source address field with the IP network 70 address of the LAC 332, a source tunnel identifier field with a tunnel identifier value assigned to a tunnel connection by the LAC 332, and a host name field with a host name identifier or a system identifier for the endpoint requested by the user of the remote client 20. When the LNS 352 receives the SCCRQ message, it establishes an L2TP peer for its end of the tunnel connection and, further, generates a Start-Control-Connection-Reply ("SCCRP") message for transmission back towards the LAC 332. When the LNS 352 generates the SCCRP message, the LNS 352 selects its own tunnel identifier value for the tunnel connection that it then inserts into a source tunnel identifier field of the SCCRP message. In addition, the LNS 352 places the address value from the source address field of the received SCCRQ message, which is the IP network 70 address of the LAC 332, into a destination address field of the SCCRP message. The LNS 352 may also insert a value from the source tunnel identifier field of the SCCRQ message into a destination tunnel identifier field of the SCCRP message. The LNS 352 then transmits the SCCRP message to the LAC 332 via the IP network 70.

Upon a receipt of the SCCRP message, the LAC 332 sends a Start-Control-Connection-Connected ("SCCN") message to the LNS 352. The SCCN message indicates a completion of the control connection establishment process. If no messages for the remote client 20 are waiting in the queue at the LNS 352, then, a Zero-Length-Body Acknowledge ("ZLB ACK") message is sent back to the LAC 332. Once the control connection is established, individual session may be created within a tunnel connection, where a single session corresponds to a single PPP data stream between the LAC 332 and the LNS 352. In one embodiment, the LAC 332 may request the LNS 352 to accept a session for placing an incoming call, and, similarly, the LNS 352 may request the LAC 332 to accept a session for placing an outgoing call.

Then a call session is initiated for an incoming call, the LAC 332 assigns a session ID value for the call session. In one embodiment, the LAC 332 assigns a unique session ID for incoming call so that it can later distinguish different call sessions within the tunnel connection. An incoming call session establishment sequence begins with the LAC 332 sending to the LNS 352 an Incoming-Call-Request ("ICRQ") message that includes a call session ID assigned to the call session on the LAC 332. In response to a received ICRQ message, the LNS 352 sends to the LAC 332 an Incoming-Call-Reply ("ICRP") message, which in turn sends an Incoming-Call-Connected ("ICCN") message to the LNS 352, thus, establishing a call session within a tunnel connection.

Similarly, when a call session is initiated for an outgoing call, the LNS 352 assigns a session ID value for the outgoing call session and initiates establishing of an outgoing call session by sending an Outgoing-Call-Request ("OCRQ") message to the LAC 332. In response to the received OCRQ message, the LAC 332 sends an Outgoing-Call-Reply ("OCRP") message to the LNS 352. Upon a completion of establishing the outgoing call session, the LAC 332 sends an Outgoing-Call-Connected ("OCCN") message to the LNS 352, thus, completing the call session establishment with the tunnel connection.

According to an exemplary embodiment, during a session set up on a tunnel connection, the LAC 332 indicates to the LNS 352 that it is capable of data compression and encryption. In one embodiment, the ICCN and OCCN messages sent from the LAC 332 to the LNS 352 define PPP compression and encryption capabilities of the LAC 332. As defined in the RFC 1661, control messages such as the SCCRQ, SCCRP, SCCCN, OCCRQ, OCCRP, OCCN, ICRQ, ICRP, or ICCN exchanged between the LNS 352 and the LAC 332 are encoded using an attribute value pair ("AVP") format. According to the preferred embodiment, when the LAC 332 generates an ICCN or OCCN message to indicate a session setup completion for an incoming or outgoing call, the LAC 332 indicates its compression control protocol ("CCP") capabilities to the LNS 352 in one or more AVPs.

Figure 4:
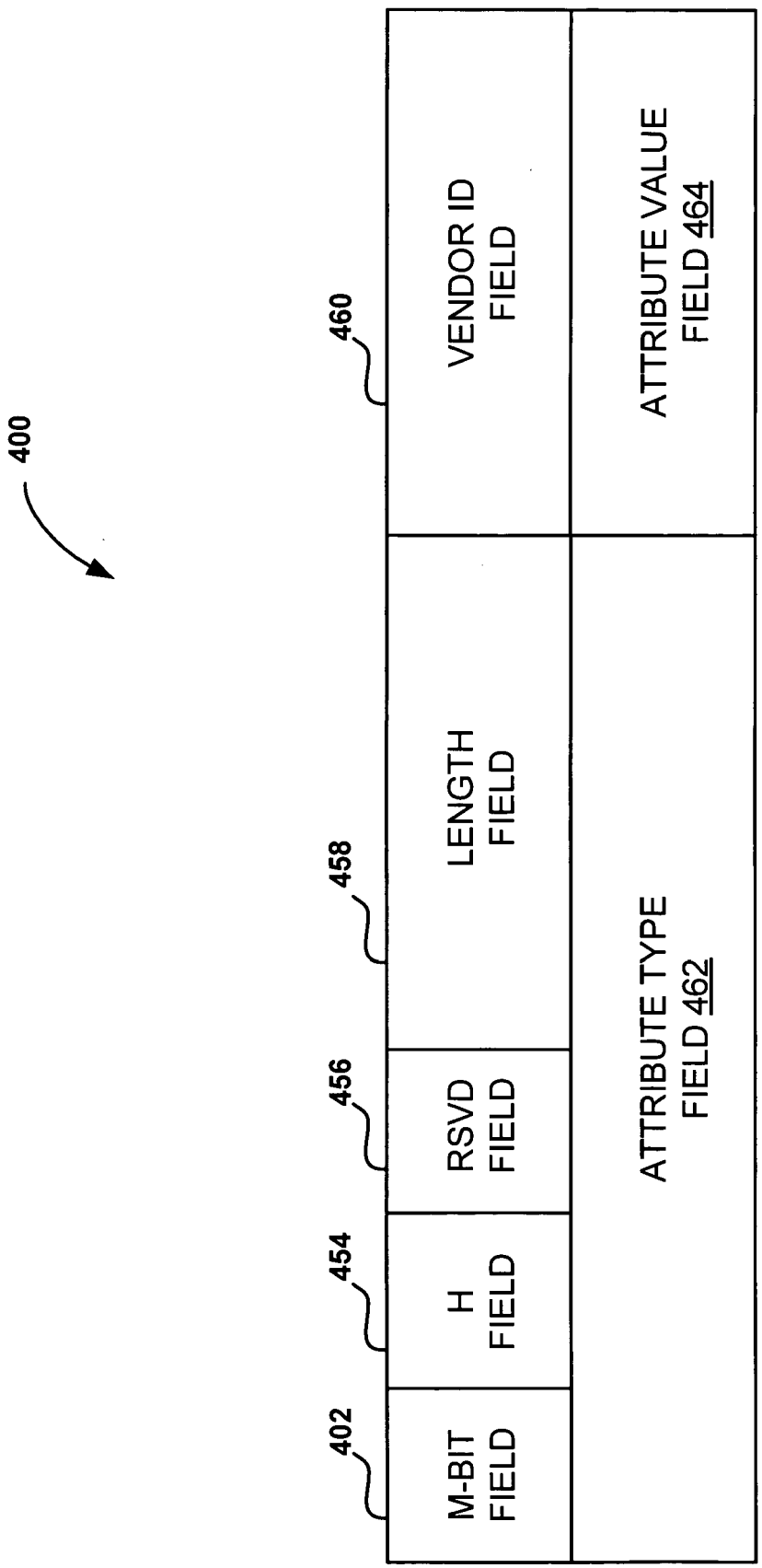
FIG. 4 is a block diagram illustrating an exemplary message encoding format according to an embodiment of the present invention.
Figure 5:
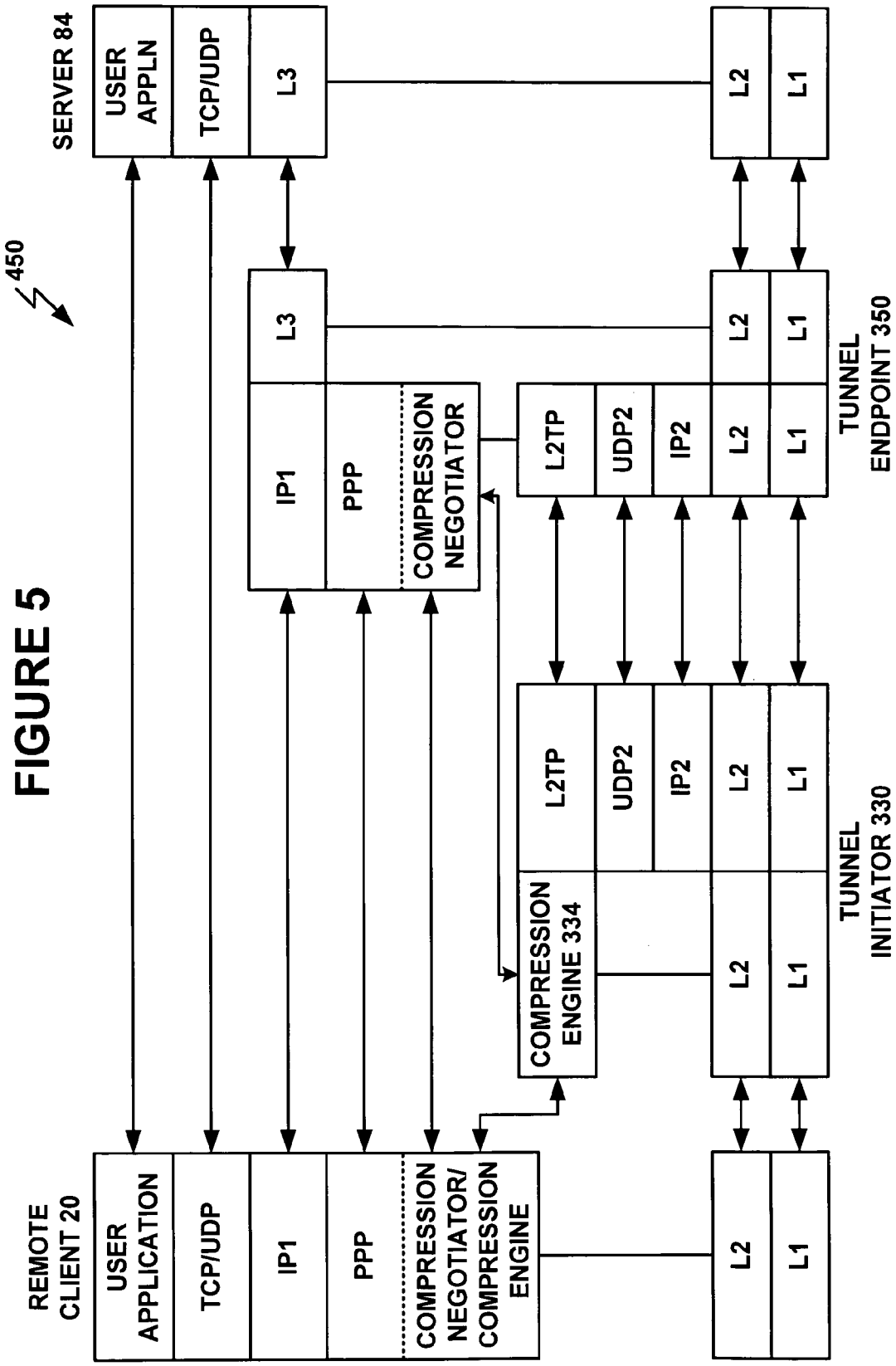
FIG. 5 is a functional block diagram illustrating a protocol stack in a tunnel connection according to an exemplary embodiment of the present invention.

FIG. 4 is a block diagram illustrating an exemplary AVP encoding format 400. The exemplary AVP encoding format includes a plurality of fields: a mandatory ("M") bit field 402, a hidden ("H") bit field 404, a reserved ("rsvd") field 406, a length field 408, a vendor ID field 410, an attribute type field 412, and an attribute value field 414. The M bit field 402 controls the behavior of an implementation that receives an unknown AVP. For example, if the M bit is not set, an unrecognized AVP is ignored, and, if the M bit is set for an unrecognized AVP within a message associated with a particular session or an overall tunnel, the session or the tunnel associated with the message may be terminated. The H bit field 404 indicates to the receiving peer whether the contents of the AVP are hidden or present in a clear text. An exemplary process for hiding the AVP contents is further described in the RFC 2661. The rsvd field 406 includes a number of bits that are reserved for future extensions. The length field 408 defines a number of octets contained in the AVP. For example, the length of the AVP may be calculated as 6 octets plus the length of the attribute value field 414. The vendor ID field 410 may define an ID of a vendor wishing to implement his own extensions, such as L2TP extensions. Such vendors can use their own vendor ID along with private attribute values, guaranteeing that they will not collide with any other vendor's extensions or future extensions. The attribute type field 412 may define a 2-octet value with a unique interpretation across all AVPs defined under a given vendor ID. The attribute value field 414 defines an actual value as indicated by the vendor ID field 410 and the attribute type field 412. It should be understood that the AVP format illustrated in FIG. 5 is only an exemplary AVP encoding, and AVP with fewer, more, different or equivalent fields could also be used.

In one embodiment, ICCN and OCCN messages generated on the LAC 332 include one or more "LAC CCP CONFREQ" AVPs defining CCP capabilities of the LAC 332. When the LNS 352 receives an ICCN or OCCN message containing a LAC CCP CONFREQ AVP, the LNS 352 identifies the LAC 332 as a compression capable LAC. The LAC CCP CONFREQ AVP may be encoded according to an encoding format illustrated in FIG. 5. In one embodiment, the attribute value field 412 defines compression capabilities of the LAC 332. For example, the compression capabilities defined in the attribute value field 462 may be encoded using a type-length-value ("TLV") format. The compression capabilities may define compression algorithms available on the compression engine 334 associated with the LAC 332. For example, the compression algorithms defined in the LAC CCP CONFREQ AVP may include PPP compression algorithms defined in the RFC 1962 such as a Microsoft Point-To-Point Compression ("MPPC") protocol, further described in the RFC 2118, a Point-To-Point Deflate Protocol, further described in the RFC 1979, a Point-To-Point BSD Compression Protocol, further described in the RFC 1977, or a Point-To-Point Stack LZS Compression Protocol, further described in the RFC-1974. However, the exemplary embodiment is not limited to a predetermined compression scheme, and any currently existing or later developed compression schemes could also be used.

Typically, a PPP compression of data is performed in combination with a PPP encryption. In one embodiment, if end-to-end security for packets is desirable, then decompressing packets on the LAC 332 may cause a security issue. In such an embodiment, Internet Protocol Security ("IPsec") standards could be employed to ensure security of the tunneled data. The IPsec is a protocol for implementing security for communication on IP networks through the use of cryptographic key management procedures and protocols. Communications between two endpoints of an IP traffic flow are made end-to-end secure by the IPsec protocol on an individual IP packet-by-packet basis. IPsec protocol entities at connection endpoints have access to, and participate in, critical and sensitive operations that make a common connection secure. However, the exemplary embodiments are not limited to using the IPsec for encoding data, and any other currently existing or later developed protocols could also be used.

According to an exemplary embodiment, when the LNS 352 receives an ICCN or OCCN message with a "LAC CCP CONFREQ" AVP defining compression capabilities of the LAC 332, the compression negotiator engine 354 on the LNS 352 performs the actual negotiations of compression settings with the remote client 20 based on the compression capabilities associated with the LAC 332. In one embodiment, a number of compression algorithms may be negotiated with the remote client 20; however, typically a single compression algorithm is used in each direction of the link. For example, a different compression algorithm may be negotiated in each direction of the link, for speed, cost, memory or other considerations. In one embodiment, the compression negotiator engine 354 on the LNS 352 may employ a Link Control Protocol ("LCP"), defined in the RFC 1661, to negotiate compression algorithms with the remote client 20. For example, the negotiator engine 354 may specify compression schemes available on the compression engine 334 when querying the remote client 20 so that the remote client 20 may select one of the available schemes. Alternatively, the negotiator engine 354 may query the remote client 20 to provide compression algorithms that the remote client 20 wishes to use for data compression. In such an embodiment, the negotiator engine 354 may negotiate one or more compression algorithms to be used on the remote client 20 based on the compression schemes available on the compression engine 334.

Upon a successful completion of the compression negotiations with the remote client 20, the LNS 352 sends a Set-Compression-Info-Request ("SCIRQ") control message to the LAC 332. The SCIRQ control message may be encoded using a message type AVP format described in the RFC 2661. The message type AVP may be a 2 octet unsigned integer having a value of 25. The SCIRQ message may include a number of AVPs directing the LAC 332 to perform compression on behalf of the LNS 352. The SCIRQ message includes an "LNS CCP CONFREQ" AVP defining the CCP parameters negotiated with the remote client 20. The LNS CCP CONFREQ AVP may be encoded according to the AVP format illustrated in FIG. 4. For example, the contents of the LNS CCP CONFREQ AVP associated with the compression schemes may be hidden using one of the existing or later developed hiding methods, or, alternatively, may be presented in the clear text.

Upon a receipt of the SCIRQ message from the LNS 352, the LAC 332 sends a Set-Compression-Info-Reply ("SCIRP") control message to the LNS 352. The message type AVP for the SCIRP message may include a value of 26. The SCIRP message may indicate a success or a failure of the LAC 332 to perform compression according to the compression schemes defined in the SCIRQ message received from the LNS 352. Thus, the SCIRP message may indicate that the LAC 332 will perform compression/decompression of data transmitted to/from the remote client 20 (the success case), or that the LAC 332 is not able to perform compression and decompression of data (the failure case). In one embodiment, the SCIRP message inludes an integer "LAC CCP Confirm" AVP having a 2-byte value field that may take a value of Success (1) or Failure (2). Similarly, to the earlier described AVPs, the LAC CCP Confirm AVP may have the AVP format 400 illustrated in FIG. 4.

Upon transferring the computationally intensive service such as compression and encryption to the LAC 332, the tunnel with a call session for the remote client 20 is now in place between the LAC 332 and the LNS 352. Each data and control packet will contain a tunnel ID and call session ID assigned by the LAC 332 or the LNS 352 to differentiate them from other tunnels and calls that may exist between the LAC 332 and the LNS 352. With the tunnel connection and compression scheme established, when the LAC 332 receives compressed packets from the remote client 20 via the PSTN 22, the compression engine 334 on the LAC 332 decompresses the packets prior to inserting the packets into the tunnel connection 356 for transmission over the IP network 70 to the LNS 352, where the packets exit the tunnel connection 356 and, for example, may be transmitted on the LAN network 80 to the server 84. Similarly, when the LNS 352 transmits data or control packets to the remote client 20, the LNS 352 forwards the packets in an uncompressed format into the tunnel connection 356 to the LAC 332. When the LAC 332 receives uncompressed packets over the tunnel connection 356, the compression engine 334 on the LAC 332 compresses the received packet for transmission on the PSTN 22 to the remote client 20.

Figure 2:
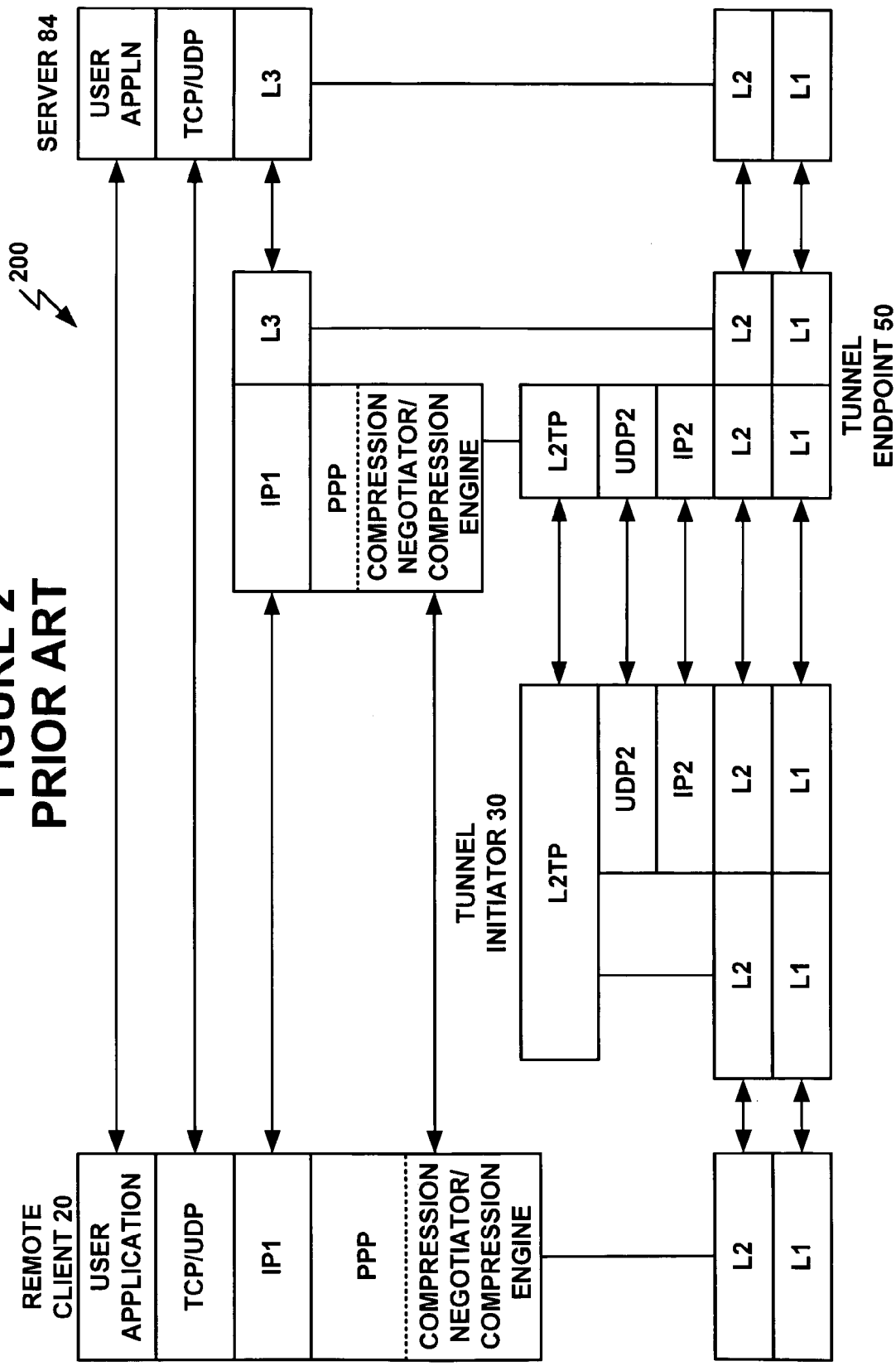
FIG. 2 is a functional block diagram illustrating an example of a protocol stack in a conventional tunnel structure.

FIG. 4 illustrates a protocol stack 450 for the system architecture 300 illustrated in FIG. 3. In addition to the protocol layers described in reference to FIG. 2, the tunnel initiator (LAC 332) protocol stack includes a compression engine 304 for communicating compression capabilities to the tunnel endpoint (LNS 352), and for performing computational services, such as computationally intensive compression, decompression and encryption on the tunnel communication link between the remote client 20 and the tunnel endpoint (LNS 352). The tunnel endpoint (LNS 352)

includes a compression negotiator 354 for negotiating service parameters, such as compression parameters, with the remote client 22 and communicating the negotiated parameters to/from the tunnel initiator (LAC 332).

FIGS. 6A and 6B are a flow chart illustrating an exemplary method 600 for compression offloading during an incoming call setup on a tunnel connection. At step 602, the remote client 20 establishes a point-to-point communication link to a network device, e.g. a tunnel initiator such as the LAC 332. For example, the remote client 20 may establish the point-to-point communication link with the LAC 332 using a dial-up connection over the PSTN 22. However, different or equivalent connections could also be used. At step 604, the LAC 332 determines whether the remote client 20 is a tunnel client. The LAC 332 may determine whether the remote client 20 is a tunnel client by querying the AAA server 74. If the remote client 20 is not a tunnel client the method 600 terminates. However, if the LAC 332 determines that the remote client 20 is a tunnel client, at step 606, the LAC 332 establishes a tunnel connection for the remote client 20 using the L2TP method, for example.

When the LAC 332 sets up a tunnel connection for the remote client 20, it initiates a call session on the tunnel connection 56 when it is triggered by an incoming or outgoing call. During a call session establishment process, at step 608, the LAC 332 provides its compression and encryption capabilities to a tunnel endpoint such as the LNS 352. In an exemplary embodiment, the LAC 332 conveys its compression and encryption capabilities to the LNS 352 in an ICCN or OCCN message including a LAC-CCP-CONFREQ AVP that defines compression and encryption capabilities of the LAC 332.

When the LNS 352 detects that the LAC 332 is capable of compressing, decompressing and encrypting data, at step 610, the LNS 352 negotiates compression and encryption parameters with the remote client 20. Upon a successful negotiation process, at step 612, the LNS 352 communicates the negotiated compression and encryption parameters to the LAC 332. According to an exemplary embodiment, the LNS 352 sends a "Set-Compression-Info-Request" control message to the LAC 332 conveying the negotiated compression and encryption parameters in an LNS CCP CONFREQ AVP. At step 614, if the LAC 332 is capable of employing the negotiated parameters, the LAC 332 configures its compression engine 334 using the received compression and encryption parameters. Thus, once the compression engine 334 is configured on the LAC 332, the LAC 332 starts compressing and decompressing data. For example, at step 616, the LAC 332 receives compressed data packets from the remote client 20 over a first communication link such as the PSTN 22. At step 618, the compression engine 334 on the LAC 332 decompresses the received packets using the compression algorithm determined during the negotiation process. At step 620, the LAC 332 inserts the decompressed packets into the tunnel connection 56 for transmission over the IP network 70 to the LNS 352, where the packets exit the tunnel connection 356 and may be further transmitted on the LAN 80.

Therefore, using the exemplary embodiment, where the PPP data compression and encryption functionality is offloaded to the LAC 332, the data throughput of a tunnel connection is increased by increasing the throughput of the dial-up connection. Further, since data compression and encryption are offloaded to the LAC 332, the LNS 352 can use its processing and memory resources to handle additional tunnel connections instead of using its capabilities for compressing, decompressing and encrypting data packets on tunnel connections.

FIG. 7 is a message sequence diagram illustrating an exemplary message scenario involving the remote client 20, the LAC 332 and the LNS 352 in the process of setting up a tunnel connection and setting up a call session within the tunnel connection according to an exemplary embodiment in which data throughput of the tunnel connection is increased. When the remote client 20 establishes a communication link with the LAC 332 using, for example, a dial-up method as shown in a message 702, the LAC 332 establishes a tunnel connection to the LNS 352, as shown in 704. During a process of establishing a call session on the tunnel connection, the LAC 332 sends a "LAC CCP CONFREQ" AVP in an ICCN message 706, conveying its compression and encryption capabilities. Upon the receipt of the ICCN message 706 with the compression capabilities of the LAC 332, the LNS 352 negotiates PPP compression and encryption parameters with the remote client 20, as shown in 708. Upon an end of the negotiation process, the LNS 352 sends a "Set-Compression-Info-Request" message 710 to the LAC 332 conveying the negotiated compression and encryption schemes in an LNS CCP CONFREQ AVP. When the LAC 332 receives the message 710, the LAC 332 sends a "Set-Compression-Info-Reply" message 712 to the LNS 352, in which the LAC 332 confirms a successful implementation of the negotiated compression and encryption schemes on the compression engine 334.

According to an exemplary embodiment, when the LAC 332 receives PPP packets 714 in a compressed format from the remote client 20, the compression engine 334 decompresses the packets using a compression algorithm associated with the call session of the remote client 20. Subsequently, the LAC 332 forwards the decompressed packets 716 to the LNS 352 on the tunnel connection 356 via the IP network 70. Similarly, the LNS 352 may forward uncompressed packets 718 on the tunnel connection 356 to the LAC 332 for the remote client 20. According to an exemplary embodiment, when the LAC 332 receives uncompressed packets from the LNS 352 on the tunnel connection 356, the compression engine 354 compresses the received packets and forwards the compressed packets to the remote client 20, as shown at 720. Upon a call termination on the remote client 20, the LAC 332 and the LNS 352 tear down the existing call session, as shown at 722. The LAC 332 and the LNS 352 may tear down the existing call session associated with the remote client 20 using a call session tear down method described in the RFC 2661. However, different or equivalent methods could also be employed.

According to an exemplary embodiment, the LNS 352 is arranged to terminate CCP on the LAC 332 if it detects too many tunnel packet errors on a tunnel link. In one embodiment, the LNS 352 may report bad packet formats to the LAC 332 so that the LAC 332 can use this information to generate compression resets. Further, in a multi-link PPP scenario, the individual PPP links may terminate on different LACs, as described in the RFC 1990, and all LACs terminating the connections may not support the same compression scheme negotiated with a remote user. In such an embodiment, the LNS 352 may perform compression on its own for a link or may terminate CCP on a multi-link if one or more LACs do not support the compression offload mechanism. In one embodiment, when the LNS 352 decides to terminate compression on a link, the LNS 352 sends a "CCP Terminate Request" message to the remote client 20, and an SCIRQ message with an integer "COMPRESSION_

TERMINATE_REQUEST" AVP to the LAC 332. According to an exemplary embodiment, the COMPRESSION_TERMINATE_REQUEST AVP may include a 2-byte termination reason code, such as a MULTI_LINK (1) or COMPRESSION_ERRORS (2) termination code reason. This AVP may have the format 400 illustrated in FIG. 4.

When the LAC 332 receives a SCIRQ message with a "COMPRESSION-TERMINATE-REQUEST" AVP, the LAC 332 generates a SCIRP message with a "COMPRESSION_TERMINATE_RESPONSE" AVP. According to an exemplary embodiment, the COMPRESSION_TERMINATE_RESPONSE AVP may define a 2-byte code of either Success (1) or Failure (0). If the LAC 332 discontinues compression and decompression of data on the tunnel link, it returns the Success code (1). Otherwise, the LAC 332 returns the Failure code (0). In one embodiment, when the LNS 352 receives the SCIRP message with the Failure code, the LNS 352 may initiate a call tear down process. However, different embodiments are possible as well.

In an embodiment, when the LNS 352 detects errors in tunnel packets received from the LAC 332, such as an incorrect protocol ID in the received tunnel packets, the LNS 352 sends a Compression-Error-Notify ("CEN") message to the LAC 332. The CEN message may include a number of AVPs having the format 400 illustrated in FIG. 4. One of the AVPs is a Message-Type AVP having a "Set-Compression-Error" value of 27, for instance. Further, the second AVP is an integer "Compression-Error" AVP having a "COMPRESSION_RESET" code value of 1.

Figure 8B:
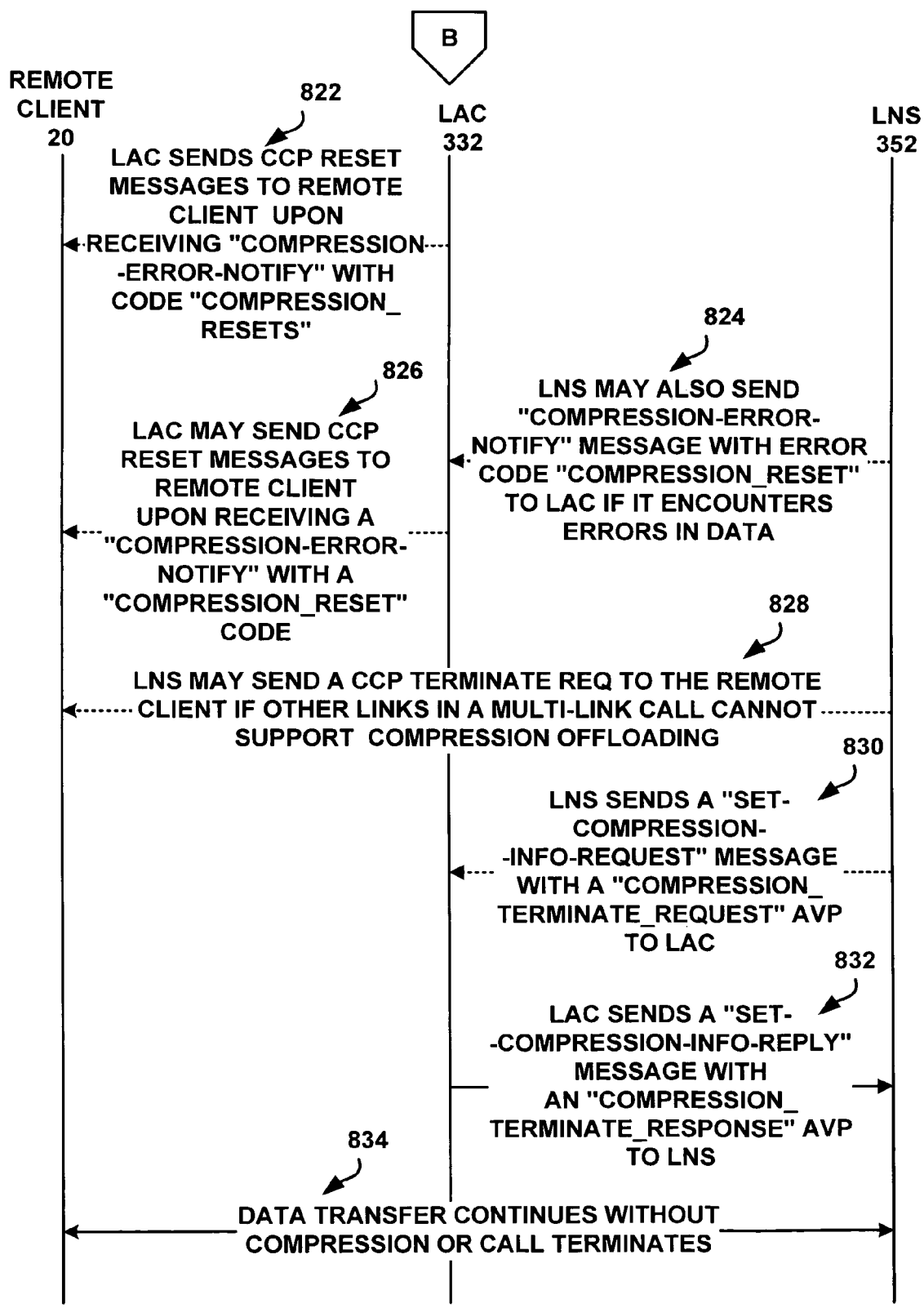

FIGS. 8A and 8B are a message sequence diagram illustrating an exemplary message scenario involving the remote client 20, the LAC 332 and the LNS 352 in the process of setting up a tunnel connection and setting up a call session within the tunnel connection according to an exemplary embodiment taking into consideration error messages exchanged between the LAC 332 and the LNS 352.

When the remote client 20 establishes a communication link with the LAC 332 using, for example, a dial-up connection, as shown in a message 802, the LAC 332 establishes a tunnel connection to the LNS 352, as shown in 804. The process for establishing the tunnel connection is illustrated using a single message 804; however, it should be understood that more than one control message is typically used for setting up a tunnel connection. During the consecutive process of establishing a call session within the tunnel connection, the LAC 332 sends a LAC CCP CONFREQ AVP in an ICCN message 806, thus, conveying its compression and encryption capabilities to the LNS 352. Upon the receipt of the ICCN message 806 defining the compression capabilities of the LAC 332, the compression negotiator 354 on the LNS 352 negotiates PPP compression and encryption parameters with the remote client 20, as shown in 808. Upon a completion of the negotiation process, the LNS 352 sends a Set-Compression-Info-Request message 810 to the LAC 332. In an exemplary embodiment, the message 810 defines the negotiated compression parameters in an LNS CCP CONFREQ AVP. When the LAC 332 receives the message 810 and configures the compression engine 334 to employ the received compression parameters for the call session associated with the remote client 20, the LAC 332 sends a Set-Compression-Info-Reply message 812 to the LNS 352. According to an embodiment illustrated in FIG. 8A, the Set-Compression-Info-Reply message 812 includes a result code associated with the successful implementation of compression parameters on the compression engine 334.

If the LAC 332 has successfully implemented the negotiated compression parameters on the compression engine 334, then, when the LAC 332 receives compressed PPP packets 814 from the remote client 20, the compression engine 334 decompresses the received packets using a compression algorithm associated with the call session within the tunnel connection 356. Subsequently, the remote client 20 forwards the decompressed packets 816 over the tunnel connection 356 on the IP network 70 to the LNS 352. Further, when the LNS 352 forwards packets over the tunnel connection 356 on the IP network 70 to the LAC 332, the packets are in an uncompressed format, as shown in 818. When the LAC 332 receives the uncompressed packets from the LNS 352, the compression engine 334 compresses the received packets using the compression algorithm for the call session associated with the remote client 20. Next, the LAC 332 forwards the compressed packets 820 to the remote client 20.

In one embodiment, when the LAC 332 encounters problems with data compression or decompression on the compression engine 334, the LAC 332 may notify the remote client 20. As illustrated in FIG. 8B, the LAC 332 may send a CCP reset message 822 to the remote client to reset the negotiated compression parameters. Similarly, if the LNS 352 encounters errors in received packets from the LAC 332, the LNS 352 sends to the LAC 332 a Compression-Error-Notify message 824 with a COMPRESSION_RESET error code. When the LAC 332 receives the Compression-Error-Notify message 824 from the LNS 352, the LAC 332 sends a CCP reset message 826 to the remote client 20. Additionally, according to one embodiment, if the LNS 352 detects that one or more LACs associated with PPP links in a multi-link call cannot support the compression offloading process, the LNS 352 may decide to terminate the compression on such a tunnel link. In such an embodiment, the LNS 352 sends a CCP Terminate Request message directly to the remote client 20, as shown in 828, and sends a Set-Compression-Info-Request message 830 with a COMPRESSION_TERMINATE_REQUEST AVP to the LAC 332. When the LAC 332 receives the message 830, the LAC 332 generates a Set-Compression-Info-Reply message 832 with a COMPRESSION_INFO_RESPONSE AVP and sends the generated message 832 to the LNS 352. If the message 832 defines a successful termination of the compression for the call session associated with the remote client 20, the LNS 352 may continue data transfer to and from the remote client 20 without performing compression and decompression on the LAC 332 until the call session terminates, as shown in 834. However, if the message 832 defines a failure of termination of the compression process on the compression engine 304 for the call session, the LNS 352 may decide to tear down the call session.

The exemplary embodiments described in the proceeding paragraphs illustrated methods for offloading compression during establishing of a call session for an incoming call. However, it should be understood that the described methods and mechanisms equally apply to outgoing calls on tunnel connections. FIG. 9 is a flow chart illustrating an exemplary method 900 for compression offloading on a tunnel connection during setting up an outgoing call session. At step 902, a tunnel endpoint (the LNS 352) initiates an outgoing tunnel connection to a tunnel initiator (the LAC 332). For example, the LNS 352 may use the L2TP method to establish a tunnel connection to the LAC 332. At step 904, the LAC 332 establishes a communication session with the remote client 20. In one embodiment, the LAC 332 uses a dial up method to establish the communication session via the PSTN 22 with the remote client 20. At step 906, during one of the stages of establishing an outgoing call session, the LAC 332 provides its compression and encryption capabilities to the LNS 352. In one embodiment, the compression and encryption capabilities of the LAC 332 are defined in a LAC-CCP-CONFREQ AVP in an OCCN message that the LAC 332 sends to the LNS 352.

When the LNS 352 receives the OCCN message defining compression and encryption capabilities of the LAC 332, at step 908, the LNS 352 negotiates compression and encryption parameters with the remote client 20. Upon a completion of the negotiation process, at step 910, the LNS 352 communicates the negotiated compression and encryption parameters to the LAC 332. According to an exemplary embodiment, the LNS 352 sends to the LAC 332 a Set-Compression-Info-Request message with an LNS-CCP-CONFREQ AVP defining the negotiated compression and encryption parameters. At step 912, the LAC 332 configures the compression engine 334 to use the negotiated compression parameters for the outgoing call session on the tunnel connection associated with the remote client 20.

Once the compression engine 334 is successfully configured, the LAC 332 may start compressing and decompressing packets associated with the outgoing call session. Thus, according to an exemplary embodiment, at step 914, the LAC 332 receives uncompressed packets from the LNS 352 via the tunnel connection on a first communication link, such as a communication link on the IP network 70. At step 916, the compression engine 334 on the LAC 332 compresses the received packets using the compression algorithm associated with the call session of the remote client 20. At step 918, the LAC 332 transmits the compressed packets over a second communication link, such as a communication link on the PSTN network 22, to the remote client 20.

The protocol according to the present invention increases remote client's data throughput over tunneled connections by offloading compression and encryption from a tunnel endpoint to a tunnel initiator. Although the present invention is described in the context of an L2TP tunnel, the present invention is applicable to any communications link where it is desirable to efficiently provide compression or other computational service on point-to-point connections. Further, the present invention is not limited to the L2TP, and it could be used with different tunneling protocols such as a Point-to-Point Tunneling Protocol ("PPTP"), described in the RFC 2637, a Layer 2 Forwarding ("L2F") Protocol, described in the RFC 2341, or other currently existing or later developed protocols.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system for compression offloading on a tunnel connection may be embodied in a computer program product that includes a computer usable medium. For example, such as, a computer usable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

We claim:

1. A method for providing a predetermined service on a portion of a point-to-point communication link, the method comprising:

receiving a request from a remote client device on a first network device over a first communication link, where the request corresponds to establishment of a point-to-point communication link between the remote client device and a second network device;

forwarding the request from the remote client device to the second network device from the first network device over a second communication link;

transmitting a service capability parameter from the first network device to the second network device, where the service capability parameter indicates that the first network device is capable of supporting the predetermined service;

negotiating the point-to-point communication link between the remote client device and the second network device, where the second network device, based on the service capability parameter, permits the remote client device to negotiate the predetermined service on the point-to-point communication link;

sending a negotiated service parameter from the second network device to the first network device, where the negotiated service parameter indicates that the predetermined service applies to the point-to-point communication link;

establishing the point-to-point communication link between the remote client device and the second network device, where the point-to-point communication link includes the first communication link between the remote client device and the first network device; and providing the predetermined service between the remote client device and the first network device on the first communication link.

2. The method of claim 1, where the predetermined service further comprises a computationally intensive service.

3. The method of claim 2, where the computationally intensive service further comprises compression and the step of providing the predetermined service between the remote client device and the first network device on the first communication link further comprises the steps of:

receiving a first compressed packet from the remote client on the first network device over the first communication link;

decompressing the first compressed packet on the first network device; and forwarding the decompressed packet to the second network device.

4. The method of claim 3, where the step of providing the predetermined service between the remote client device and the first network device on the first communication link further comprises the steps of:
   receiving an uncompressed packet from the second network device in the first network device on the second communication link;
   compressing the uncompressed packet in the first network device to form a second compressed packet; and
   forwarding the second compressed packet to the remote client device from the first network device on the first communication link.

5. The method of claim 2, where the computationally intensive service further comprises encryption and the step of providing the predetermined service between the remote client device and the first network device on the first communication link further comprises the steps of:
   receiving a first encrypted packet from the remote client in the first network device over the first communication link;
   decrypting the first encrypted packet in the first network device; and
   forwarding the decrypted packet to the second network device.

6. The method of claim 5, where the step of providing the predetermined service between the remote client device and the first network device on the first communication link further comprises the steps of:
   receiving an unencrypted packet from the second network device in the first network device;
   encrypting the unencrypted packet in the first network device to form a second encrypted packet; and
   forwarding the second encrypted packet to the remote client device from the first network device on the first communication link.

7. The method of claim 1, where the first communication link further comprises a communication path through a first communication network and the second communication link further comprises a communication path through a second communication network.

8. The method of claim 7, where the first communication link further comprises a circuit switched path through a public switched telephone network and the second communication link further comprises a virtual path through a packet switched computer network.

9. The method of claim 1, where the point-to-point communication link further comprises a tunnel communication link.

10. The method of claim 9, wherein the tunnel communication link comprises one of a Layer 2 Tunneling Protocol (L2TP) connection and a Point-to-Point Tunneling Protocol connection.

11. The method of claim 1, where the service capability parameter is encoded in a first Attribute Value Pair (AVP) format and the negotiated service parameter is encoded in a second AVP format.

12. The method of claim 1, where the first network device further comprises a tunnel initiator and the second network device further comprises a tunnel endpoint.

13. The method of claim 12, where the tunnel initiator further comprises a Level 2 Tunneling Protocol Access Concentrator (LAC) and the tunnel endpoint further comprises a Level 2 Tunneling Protocol Network Server (LNS).

14. A method for providing at least one computational service on a communication link, the method comprising:

detecting a call associated with at least one remote client device in communication with a first network device over a first communication link;

establishing a point-to-point communication link from the first network device to a second network device over a second communication link responsive to detecting the call associated with the remote client device in communication with the first network device;

transmitting a connection connect message from the first network device to the second network device, the connection connect message comprising at least one computational service capability parameter associated with the first network device;

negotiating computational service parameters with the remote client device from the second network device responsive to receiving the connection connect message comprising the at least one computational service capability parameter associated with the first network device;

forming a computational service set up request message on the second network device, the computational service set up request message comprising the computational service parameters negotiated with the second network device;

transmitting the computational service set up request message from the second network device to the first network device;

implementing the computational service parameters received from the second network device on a computational service engine associated with the first network device responsive to receiving the computational service set up request message on the first network device;

forming a computational service set up reply message on the first network device, the computational service set up reply message comprising a computational service implementation status parameter; and transmitting the computational service set up reply message from the first network device on a second computer network to the second network device;

wherein the computational service comprises a computationally intensive service:

and wherein the computationally intensive service comprises a compression service;

and further comprising:

receiving compressed packets on the first network device from the remote client device over the first communication link;

decompressing the compressed packets on the computational service engine prior to transmitting the packets on the communication link to the second network device; and transmitting the decompressed packets from the first network device to the second network device on the second communication link.

15. The method of claim 14, further comprising:

receiving uncompressed packets on the first network device from the second network device on the second communication link;

compressing the received uncompressed packets on the computational service engine prior to transmitting the packets on the first computer network to the remote client device; and transmitting the compressed packets from the first network device over the first communication link to the remote client device.

16. A communication system for offloading at least one computational service on a portion of a point-to-point communication link, the system comprising:
- a first network device communicating with at least one remote client device over the first communication link, the first network device further coupled to a second communication link, the first network device configured to establish the point-to-point communication link with a second network device and transmit a connection connect message over the second communication link, the connection connect message comprising at least computational service capability parameter associated with at least one computational service mechanism available on a computational service engine associated with the first network device, wherein the point-to-point communication link includes the first communication link and the second communication link; and
- the second network device coupled to the second communication link and configured to receive the connection connect message from the first network device, and responsive thereto;
- negotiate computational service parameters with the at least one remote client device;
- form a computational service set-up request message comprising at least one negotiated computational service parameter; and
- transmit the computational service set-up request message on a second computer network;

wherein:

the first network device is further configured to receive the computational service set-up request message from the second network device and to implement the at least one negotiated computational service parameter received in the computational service set-up request message on the computational service engine so that the computational service engine applies at least one computational service to packets on the first communication link.

17. The communication system of claim 16, where:

the computational service engine is configured to receive compressed packets on the first communication link from the at least one remote client device, and responsive thereto, decompress the received packets and transmit the decompressed packets on the second communication link to the second network device; and the computational service engine is further configured to receive uncompressed packets on the second communication link from the second network device, and responsive thereto, compress the received packets and transmit the compressed packets on the first communication link to the remote client device.

* * * * *